Figure 1:
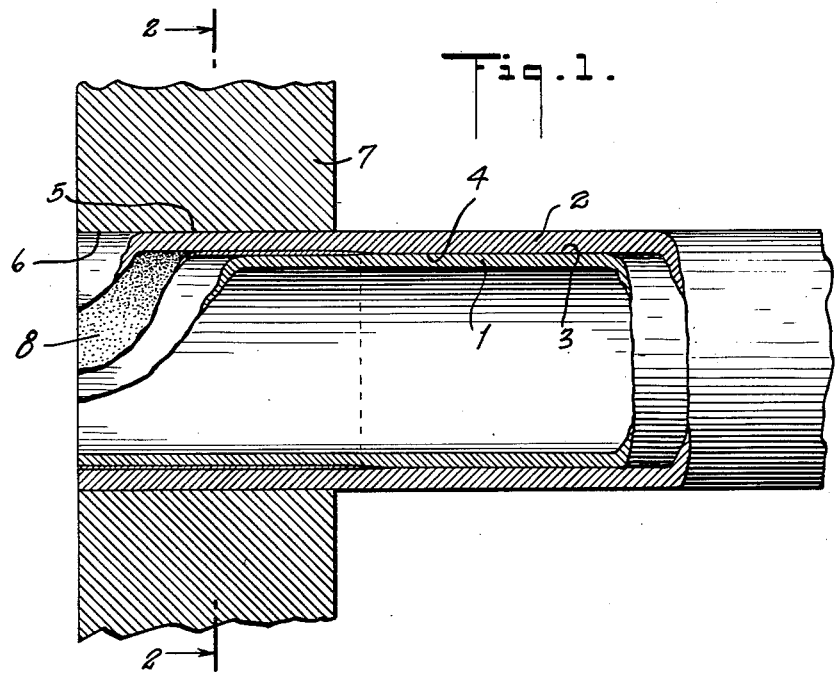

March 3, 1964  A. R. PELS ETAL  3,123,133

DUPLEX TUBES

Filed Dec. 30, 1958

INVENTORS
ALAN R. PELS
FRANCIS R. CARROLL
BY
ATTORNEYS

United States Patent Office 3,123,133
Patented Mar. 3, 1964

3,123,133
DUPLEX TUBES
Alan R. Pels, Stamford, and Francis R. Carroll, Southport, Conn., assignors to National Distillers and Chemical Corporation, a corporation of Virginia
Filed Dec. 30, 1958, Ser. No. 783,933
4 Claims. (Cl. 165—178)

This invention relates to duplex tubes used in heat exchangers, such as tubular condensers.

Such a tube comprises two tubes telescoped together with their opposing surfaces pressed together tightly enough to restrain the tubes from sliding relative to each other. However, these surfaces are separable from each other if the outer tube expands or the inner tube collapses. These opposing surfaces are not bonded together. Thus it can be said that the tubes' opposing surfaces are separably pressed together. One tube is made of ferrous metal, such as steel, and the other tube is made of cuprous metal, such as admiralty metal. Either tube may be the inside or outside tube depending on the design of the equipment.

When a fluid introduces hydrogen to the exposed surface of the ferrous tube this hydrogen can diffuse through the ferrous metal. It cannot diffuse in the same manner through the cuprous tube. Therefore, the hydrogen accumulates between the opposing surfaces of the two tubes and attempts to pass therebetween along the tubes' length.

Such duplex tubes have end portions for radial expansion in the holes of the two tube sheets of the heat exchanger. Such tube sheets are made of relatively thick metal through which holes are formed for receiving these end portions, the latter being inserted through these holes and expanded tightly into fluid-tight engagement with the tube sheet portion surrounding the holes. This expansion is effected in such a way as to frequently, if not always, fluid-tightly seal together the opposing surfaces of the two tubes of each duplex tube.

It follows that when in service the hydrogen cannot escape from between the opposing surfaces of the two tubes of the duplex tube. Therefore, the hydrogen continues to build up between these surfaces until a fluid pressure is developed sufficient to put the duplex tube out of service because of deformation of one or the other of its tube components. Because of these conditions a duplex tube may be rendered unserviceable in as little as one month's time and sometimes less. The heat exchanger must be taken out of service to replace this tube.

With the foregoing in mind, an object of the present invention is to provide a duplex tube having such telescoped tube components having different permeabilities to hydrogen or other gases, which will always permit the escape of gas collecting between the opposing surfaces of its tube components when the duplex tube is in service. Another object is to make such a duplex tube in a manner permitting its commercial production and sale under competitive conditions. Other objects may be inferred from the following.

Figure 2:
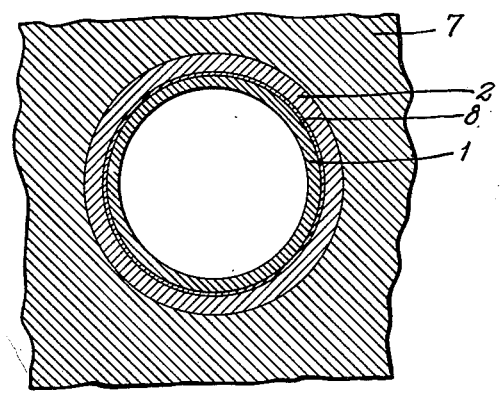

An example of the invention is illustrated by the accompanying drawings in which:

FIG. 1 shows one of the end portions of the tube inserted in the tube hole of one of the tube sheets, this view being partly in elevation and partly in section to illustrate the invention; and FIG. 2 is a cross section taken on the line 2—2 in FIG. 1.

Referring to these drawings, the two tubular components are numeraled 1 and 2. One is ferrous and one is cuprous, the two tubes are telescoped together with their opposing surfaces 3 and 4 separably pressed together and the end portion 5 (only one being shown by FIG. 1) is adapted for radial expansion in the tube sheet hole 6 of the tube sheet 7 when this end portion 5 is inserted in the tube sheet hole 6 as shown. Normally such radial expansion introduces the problem described above.

According to this invention a gas-permeable layer 8 is located between the surfaces 3 and 4 for at least the extent of the end portion 5. Preferably this layer comprises a substantially uniform distribution of hard particles.

This gas-permeable layer 8 is of such a character that it prevents the surfaces 3 and 4 from sealing together gas-tightly when the end portion 5 is expanded in the hole 6. This expansion is effected by force applied radially outwardly to the inner surface of the tube 1, this force necessarily being transmitted through the surfaces 3 and 4 to the tube 2. This layer 8 provides a gas-leak for any gas collecting between the surfaces 3 and 4 throughout the length of the duplex tube formed by the tubes 1 and 2. Because of its uniform extent the layer 8 prevents the surfaces 3 and 4 from sealing together gas-tightly. The action is like trying to seal two parts together with dirt particles betweentheir interfaces when a gas-tight seal is actually desired. Such dirt particles prevent gas-tight sealing. Any attempt to form a well defined channel lengthwise in the one or the other of the surfaces 3 and 4 is not so effective because during the expansion of the end portion 5 the metal of the tubes is forged together and closes such a channel.

A duplex tube is made ordinarily by telescoping the two tubes 1 and 2 completely together and then compressing the two tubes together so as to unite them by compressive intercontact. The duplex tube of the present invention may be made in the same way excepting that the layer 8 should be interposed prior to the tube components being telescoped together. Usually there is about $\frac{1}{16}$ of an inch difference between the inside and outside diameters of the outer and inner tubes, thus leaving room for the layer 8. If the end portions are to be cropped the length of the layer 8 must be adequate to provide the layer where it is needed at the end portion of the finished length of duplex tube.

In practicing the present invention, each end of the duplex tube has been provided with one of the layers 8. This is a safety precaution, it being obvious that only one end portion of the tube need be provided with this means for forming a gas-leak.

Considering either end, in practicing the present invention the layer 8 has been provided by wrapping sandpaper or emery cloth around the tubular part 1 before the part 2 is telescoped over it. The difference of about $\frac{1}{16}$ of an inch between the outside diameter of the tube 1 and the inside diameter of the tube 2 accommodates these layers. Another way is to coat the outside of the end portion of the tube 1 with an adhesive and by means of this adhesive fasten a uniform distribution of particles of sand, silicon carbide, or other abrasives directly on the tube 1.

In all instances the size of the particles used should not be too fine to permit the layer 7 to function in its described manner.

The end portions of a duplex tube are commonly annealed to condition these portions for the expansion described, it being understood that this expansion is effected while the tube is cold. When sand is used it may fuse during this end annealing yet the desired gas leakage is effected. Apparently any resulting vitreous layer crumbles during the expansion of the end portion 5 in the hole 6.

The layer 8 may be provided by electroplating the outside of the end portion of the tube 1 with chromium. This is done to provide the characteristic dull appearance of unpolished electroplated chromium. Presumably in this instance also the desired gas leakage is obtained in part because the layer crumbles or fragments during the expansion of the end portion 5. An electroplated chromium layer is inherently porous in any event.

Generally speaking, it is believed that any frangible layer may form the layer 8. As previously described this layer may also comprise fragments or a dispersion of almost any kind of hard particle. Materials which are ductile, malleable or otherwise plastically deformable under pressure should be avoided. The materials used should be hard, brittle or otherwise of such a character as to function as particles after the expansion of the end portion of the duplex tube.

We claim:

1. A duplex tube including two tubes respectively of differing gas permeabilities and telescoped together with their opposed surfaces separably pressed together and having end portions for radial expansion in tube sheet holes, and a gas-permeable layer located between said surfaces for the extent of at least one of said portions, said layer comprising a substantially uniform distribution of hard particles.

2. A duplex tube including two tubes respectively of differing gas permeabilities and telescoped together with their opposed surfaces separably pressed together and having end portions for radial expansion in tube sheet holes, and a gas-permeable layer located between said surfaces for the extent of at least one of said portions, said layer comprising metal particles plated on one of said surfaces.

3. The combination including a tube sheet having a tube hole, a duplex tube including two tubes respectively of differing gas permeabilities and telescoped together with opposed surfaces separably pressed together and having an end portion radially expanded in said hole, and a gas-permeable layer interposed between said surfaces for the extent of said portion and forming a gas-leak for gases collecting between said surfaces throughout the length of said tube, said layer comprising a substantially uniform distribution of hard particles.

4. The combination including a tube sheet having a tube hole, a duplex tube including two tubes respectively of differing gas permeabilities and telescoped together with opposed surfaces separably pressed together and having an end portion radially expanded in said hole, and a gas-permeable layer interposed between said surfaces for the extent of said portion and forming a gas-leak for gases collecting between said surfaces throughout the length of said tube, said layer comprising metal particles plated on one of said surfaces.

References Cited in the file of this patent

UNITED STATES PATENTS

| | | |
|---|---|---|
| 878,014 | O'Toole | Feb. 4, 1908 |
| 2,343,542 | Faunce | Mar. 7, 1944 |
| 2,386,747 | Ris | Oct. 16, 1945 |
| 2,895,511 | Seltman | July 21, 1959 |